United States Patent
Oshida

(10) Patent No.: US 11,358,609 B2
(45) Date of Patent: Jun. 14, 2022

(54) METHOD FOR WARNING A DRIVER OF A MOTORCYCLE AS WELL AS RIDE ASSISTANT CONTROLLER AND MOTORCYCLE IMPLEMENTING SUCH METHOD

(71) Applicant: Robert Bosch GmbH, Stuttgart (DE)

(72) Inventor: Yuki Oshida, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 16/832,232

(22) Filed: Mar. 27, 2020

(65) Prior Publication Data

US 2020/0339144 A1  Oct. 29, 2020

(30) Foreign Application Priority Data

Apr. 25, 2019 (EP) ..................................... 19170971
Mar. 23, 2020 (EP) ..................................... 20164781

(51) Int. Cl.
| | |
|---|---|
| *B60W 50/14* | (2020.01) |
| *B60W 10/06* | (2006.01) |
| *B60W 10/11* | (2012.01) |
| *B60W 10/184* | (2012.01) |
| *B60W 40/112* | (2012.01) |

(52) U.S. Cl.
CPC ............ *B60W 50/14* (2013.01); *B60W 10/06* (2013.01); *B60W 10/11* (2013.01); *B60W 10/184* (2013.01); *B60W 40/112* (2013.01); *B60W 2300/36* (2013.01); *B60W 2554/406* (2020.02)

(58) Field of Classification Search
CPC ...... B60W 50/14; B60W 10/06; B60W 10/11; B60W 10/184; B60W 40/112; B60W 2300/36; B60W 2554/406; B60T 2201/022; B60T 7/22; B60J 45/4151; B62J 50/21; B62J 27/00; B62J 3/00; B62J 99/00; B62L 3/00
See application file for complete search history.

(56) References Cited

U.S. PATENT DOCUMENTS

| | | | |
|---|---|---|---|
| 2004/0098185 A1* | 5/2004 | Wang ....................... | B62H 1/12 701/91 |
| 2012/0239265 A1 | 9/2012 | Kato et al. | |

(Continued)

FOREIGN PATENT DOCUMENTS

| | | | | |
|---|---|---|---|---|
| DE | 102013200044 A1 | 7/2014 | | |
| DE | 102015104547 A1 | 9/2016 | | |
| WO | WO-2014064730 A1 * | 5/2014 | .......... | B60L 15/2009 |

(Continued)

*Primary Examiner* — Mary Cheung
(74) *Attorney, Agent, or Firm* — Norton Rose Fulbright US LLP; Gerard Messina

(57) ABSTRACT

A method for warning a driver of a motorcycle and a ride assistant controller for implementing or controlling such method are described. The method includes monitoring traffic situations based on signals from at least one sensor; upon detecting a critical traffic situation based on the signals from the at least one sensor, warning the driver by inducing an acceleration change onto the motorcycle; wherein a current lean angle of the motorcycle is monitored and a manner and/or degree of inducing the acceleration change onto the motorcycle is set taking into account the current lean angle of the motorcycle.

11 Claims, 2 Drawing Sheets

(56) References Cited

U.S. PATENT DOCUMENTS

2019/0211919 A1* 7/2019 Nishimura .......... F16H 61/0213
2020/0331460 A1* 10/2020 Igari ..................... B60W 30/16

FOREIGN PATENT DOCUMENTS

| WO | 2018172870 A1 | 9/2018 |
| WO | 2018172871 A1 | 9/2018 |
| WO | 2018185577 A1 | 10/2018 |
| WO | 2018197965 A1 | 11/2018 |
| WO | 2019025886 A1 | 2/2019 |
| WO | 2019038609 A1 | 2/2019 |

* cited by examiner

METHOD FOR WARNING A DRIVER OF A MOTORCYCLE AS WELL AS RIDE ASSISTANT CONTROLLER AND MOTORCYCLE IMPLEMENTING SUCH METHOD

CROSS REFERENCE

The present application claims the benefit under 35 U.S.C. § 119 of European Patent Application No. EP 19170971.6 filed on Apr. 25, 2019, and European Patent Application No. EP 20164781.5 filed on Mar. 23, 2020, each of which is expressly incorporated herein by reference in its entirety.

FIELD

The present invention relates to a method for warning a driver of a motorcycle. Furthermore, the present invention relates to a ride assistant controller for a motorcycle and to a motorcycle comprising such controller as well as to a computer program product for implementing and controlling the method and a computer readable medium comprising such computer program product.

BACKGROUND INFORMATION

Upon driving a vehicle, critical or even hazardous traffic situations may occur. In modern vehicles, sensors may be provided which may sense parameters indicating such critical situations. Accordingly, based on sensor signals, a driver of the vehicle may be warned.

Assistant controllers have been developed for cars, i.e. for 4-wheel-vehicles, which may warn a driver by temporarily activating brakes of the car in case a critical situation is detected.

However, until now, the approach of an automatic warning brake function could not be used in motorcycles, i.e., in 2-wheel-vehicles.

SUMMARY

The present invention provides an example method for warning a driver of a motorcycle, an example ride assistant controller and an example motorcycle comprising such ride assistant controller with which an automatic warning brake function may be adapted and used for motorcycles.

Example embodiments of the present invention may allow warning a driver of a motorcycle in an advantageous manner by temporarily changing the acceleration acting onto the motorcycle while taking into account a current driving condition of the motorcycle. Thereby, inter alia, the process of warning the driver may be made more secure.

According to a first aspect of the present invention, an example method for warning a driver of a motorcycle is provided.

The example method comprises:
monitoring traffic situations based on signals from at least one sensor;
upon detecting a critical traffic situation based on the signals from the at least one sensor, warning the driver by inducing an acceleration change onto the motorcycle;
wherein a current lean angle of the motorcycle is monitored and a manner and/or degree of inducing the acceleration change onto the motorcycle is set taking into account the current lean angle of the motorcycle,
wherein the acceleration change is induced by at least actuating a front wheel brake of the motorcycle in case the current lean angle is smaller than a predetermined first lean angle value,
wherein the acceleration change is induced exclusively by one or more of actuating a rear wheel brake of the motorcycle, reducing an acceleration torque generated by an engine of the motorcycle and temporarily shifting an automated transmission of the motorcycle to a lower gear in case the current lean angle is bigger than the predetermined first lean angle and smaller than a predetermined second lean angle value, the first lean angle value being smaller than the second lean angle value,
wherein no acceleration change is induced in case the current lean angle is bigger than the predetermined second lean angle.

According to a second aspect of the present invention, an example ride assistant controller for a motorcycle is provided, wherein the controller is adapted for one of implementing and controlling an example method according to an embodiment of the first aspect of the present invention.

According to a third aspect of the present invention, a example motorcycle is provided, the example motorcycle comprises an example ride assistant controller according to an embodiment of the second aspect of the present invention and an acceleration sensor for determining the current lean angle of the motorcycle.

According to a fourth aspect of the present invention, an example computer program product is provide which includes computer readable instructions which, when executed on a processor of a programmable ride assistant controller, instruct the processor to implementing and controlling a method according to an embodiment of the first aspect of the present invention.

According to a fifth aspect of the present invention, an example computer readable medium is provided to comprise stored thereon a computer program product according to an embodiment of the fourth aspect of the present invention.

Example aspects underlying embodiments of the present invention may be interpreted as being based, inter-alia, on the following:

As indicated further above, an automatic warning brake function has already been suggested for cars. However, it has been found that this may not be simply transferred to motorcycles. Particularly, it has been found that automatically actuating a brake of a motorcycle may in certain conditions significantly disturb a driver of the motorcycle or even result in critical or hazardous effects onto the motorcycle's driving condition.

Particularly, it has been found that dynamics of motorcycles significantly differ from dynamics of cars due to the fact that motorcycles have only two instead of four wheels. Due to the fact that motorcycles are single-track vehicles, a motorcycle may lean, i.e., may deviate from a vertical orientation, at a lean angle for example when turning.

When a motorcycle is upright, i.e., the lean angle is 0°, its dynamics are similar to those of cars in that actuating brakes results in a negative acceleration, i.e., a deceleration, of the motorcycle in the driving direction. However, upon the motorcycle being leaned, i.e., the lean angle being larger than 0°, additional to the acceleration change, gyroscopic forces are generally induced onto the motorcycle. For example, upon being decelerated, the leaned motorcycle may tend to change its lean angle, thereby possibly also changing its future driving trajectory. Such influences onto the motorcycle may disturb the driver or even result in dangerous situations.

Accordingly, an example method for warning a driver is provided which specifically takes into account the characteristics of a motorcycle being different from those of cars.

Particularly, it is not only detected whether a critical traffic situation occurs and then for example brakes of the motorcycle are actuated for inducing an acceleration change onto the motorcycle. Instead, the current lean angle of the motorcycle is monitored and taken into account when setting the manner and/or degree of inducing the acceleration change.

In other words, additional to the sensor signals indicating the critical traffic situation, the further parameter indicating the current lean angle of the motorcycle is taken into account when determining whether or not the driver of the motorcycle shall be warned by inducing the acceleration change onto the motorcycle and/or when determining in which way and/or to what degree the acceleration change should be induced.

Thereby, the example method for warning the driver may be adopted such that the current driving situation and especially the current lean angle of the motorcycle is taken into account before or upon initiating an automatic warning brake function,
wherein the acceleration change is induced by at least actuating a front wheel brake of the motorcycle in case the current lean angle is smaller than a predetermined first lean angle value,
wherein the acceleration change is induced exclusively by one or more of actuating a rear wheel brake of the motorcycle, reducing an acceleration torque generated by an engine of the motorcycle and temporarily shifting an automated transmission of the motorcycle to a lower gear in case the current lean angle is bigger than the predetermined first lean angle and smaller than a predetermined second lean angle value, the first lean angle value being smaller than the second lean angle value,
wherein no acceleration change is induced in case the current lean angle is bigger than the predetermined second lean angle.

Thereby, the manner and/or degree of inducing the acceleration change may be set such that the driver is not disturbed and/or the acceleration change itself does not bring the motorcycle into a critical driving mode. Accordingly, a safety and/or effectiveness of the automatic warning brake function for a motorcycle may be improved. So the actuation of the wheel brakes and the reduction of the acceleration torque are applied for a predetermined period of time. Also the shifting of an automated transmission of the motorcycle to a lower gear will be compensated by shifting back to the original higher gear within a predetermined period of time.

In an example embodiment of the present invention, the period of time is chosen between 0.1 seconds and 2 seconds.

For example, according to an example embodiment, a strength of the induced acceleration change may be set the higher the smaller the current lean angle is.

In other words, when the motorcycle is upright or only slightly leaned, a stronger acceleration change may be induced as when the motorcycle is significantly leaned. For example, when the motorcycle is at a lean angle of more than 15°, the induced acceleration change may be significantly smaller, i.e. may be less than 80% or even less than 50%, of the acceleration change induced upon a lean angle of 0°, possibly including a tolerance of ±5°.

For example, the induced acceleration change may vary linearly or non-linearly with the current lean angle of the motorcycle. For example, the induced acceleration change may be maximum at a lean angle of 0° and may be minimum or maybe even zero at a predetermined maximum lean angle value of for example 30°.

The acceleration change may be induced by actuating a front wheel brake of the motorcycle, actuating a rear wheel brake of the motorcycle, reducing an acceleration torque generated by an engine of the motorcycle and/or shifting an automated transmission of the motorcycle to a lower gear.

Expressed differently, there are various ways of inducing the acceleration change onto a driving motorcycle. The option to be chosen for a specific driving condition may be determined taking into account the current lean angle of the motorcycle. Possibly, also the type of critical traffic situation determined based on the signals from the sensor in the motorcycle and/or other influences may be taken into account upon setting the option for inducing the acceleration change.

One option for effecting the acceleration change is to actuate one of the wheel brakes of the motorcycle. Therein, it may be taken into account that the front wheel brake and the rear wheel brake have different characteristics regarding their braking effectiveness as well as their influences onto the driving dynamics of the motorcycle. For example, actuating front wheel brakes of a motorcycle will most effectively decelerate the motorcycle but may result in very dangerous driving situations in case excessive forces are induced onto the front wheel such that the front wheel loses its traction. On the other hand, actuating rear wheel brakes of the motorcycle will result in a less effective deceleration, but for example a blocking rear wheel is generally much less dangerous than a blocking front wheel.

Accordingly, by taking into account the current lean angle of the motorcycle upon determining whether any wheel brakes of the motorcycles are to be actuated, which of the wheel brakes of the motorcycle is to be actuated and/or to what degree one or both of the wheel brakes are to be actuated, the motorcycle may be temporarily be decelerated by a braking action, thereby effectively warning the driver upon a critical traffic situation being detected.

Alternatively, the acceleration change onto the motorcycle may be induced by reducing an acceleration torque generated by the engine of the motorcycle. This means, instead of or additionally to actuating any wheel brakes, and acceleration acting onto the motorcycle may be temporarily changed by throttling the power generated by the motorcycle's engine. The driver may intuitively feel this reduced power and may interpret it as a warning. Furthermore, temporarily reducing the power generated by the engine typically also reduces noises generated by the engine, thereby additionally emphasising the warning signal.

As a further alternative, an automated transmission of the motorcycle may be shifted to a lower gear in order to thereby induce the acceleration change. Upon such shifting to a lower gear, the engine of the motorcycle typically has to rotate at a higher rate. Thereby, a change in the acceleration acting onto the motorcycle is typically induced. Furthermore, the higher rotation rate generally results in higher noise generation and/or noise generation at a different frequency. Both effects may attract the driver's attention and thereby warn the driver.

In a specific embodiment, a front wheel brake of the motorcycle is actuated for inducing the acceleration change exclusively in case the current lean angle is smaller than a predetermined first lean angle value.

In other words, the acceleration change is induced by actuating the front wheel brake of the motorcycle only in those cases where the determined current lean angle is for example sufficiently small such that the braking action at the front wheel does not result in any undesired effect onto the driving dynamics of the motorcycle or even a loss of traction at the front wheel. In cases where the current lean angle is larger than the predetermined first lean angle value, no actuation of the front wheel brakes may be allowed for generating the intended acceleration change. For example, when the current lean angle is detected to exceed the predetermined first lean angle value, only other options for generating the acceleration change such as actuating the rear wheel brakes, reducing the acceleration torque generated by the engine of the motorcycle and/or shifting the automatic transmission of the motorcycle to a lower gear may be applied.

For example, the predetermined first lean angle value may be smaller than 20°. Particularly, the first lean angle value may be in a range of between 10° and 20°. For example, the first lean angle value may be 15°.

Optionally, the first lean angle value may be set depending on a specific type of a motorcycle and its dynamics. For example, the first lean angle value may be set to a larger value of for example 17° for motorcycles having a low centre of gravity such as street or race motorcycles whereas the first lean angle value may be set to a smaller value of for example 13° for motorcycles having a higher centre of gravity such as for example off-road motorcycles.

Furthermore, the predetermined first lean angle value may be set fixedly. Alternatively, the predetermined first lean angle value may be adjustable for example by a driver depending for example on the driver's preferences and/or driving skills.

The acceleration change is induced exclusively when the current lean angle is smaller than a predetermined second lean angle value.

In other words, when the current lean angle is detected to exceed the predetermined second lean angle value, no inducing of the acceleration change may be allowed anymore. This means that for driving situations in which the motorcycle is leaned beyond an acceptable maximum lean angle, any inducing of the acceleration change is prevented. Accordingly, in such driving situations, the driver will not be warmed by any acceleration change about any critical traffic situation. However, this is to be preferred as inducing the acceleration change could additionally confuse the driver in such leaned driving situation and/or could even induce driving instability of the motorcycle due to the additional acceleration forces onto the leaned vehicle.

For example, the predetermined second lean angle value may be smaller than 35°. Particularly, the predetermined second lean angle value may be in a range of between 25° and 35°. For example, the predetermined lean angle value may be 30°.

Similar to the first lean angle value, also the second lean angle value may be set depending on a specific type of a motorcycle and its dynamics. For example, the second lean angle value may be set to a larger value of for example 33° for motorcycles having a low centre of gravity whereas the first lean angle value may be set to a smaller value of for example 27° for motorcycles having a higher centre of gravity.

Furthermore, the predetermined second lean angle value may be fixedly set. Alternatively, the predetermined second lean angle value may be adjustable for example by a driver depending on the driver's preferences and/or driving skills.

Embodiments of the example method according to the present invention may be implemented or controlled by a ride assistant controller in the motorcycle.

Therein, the example ride assistant controller may comprise the at least one sensor for monitoring the traffic situations. Alternatively, the ride assistant controller itself does not have such sensor but such sensor is comprised in the motorcycle and the ride assistant controller has an interface and/or signal line for communicating with such external sensor. The sensor for monitoring the traffic situations may be configured for sensing conditions in the environment of the motorcycle and/or conditions acting onto the motorcycle itself. For example, the sensor may be one of a radar sensor, an optical sensor such as a camera, an ultrasonic sensor, etc. It is also possible to use a plurality and/or variety of sensors for monitoring traffic situations. Furthermore, traffic situations may be monitored based on sensor signals of sensors detecting driving characteristics of the motorcycle itself such as a velocity sensor, a steering angle sensor, an acceleration sensor, etc.

Furthermore, the ride assistant controller may comprise an acceleration sensor for determining the current lean angle of the motorcycle. Alternatively, such acceleration sensor is not comprised in the ride assistant controller itself but is comprised in the motorcycle and the ride assistant controller may communicate with such acceleration sensor via an interface and/or a signal line.

Embodiments of the method proposed herein may be implemented in hardware, software or a combination of hardware and software. Particularly, the example ride assistant controller may be programmable or may be part of a programmable controller applied in the motorcycle for other purposes. Such programmable device may be programmed using embodiments of the computer program product according to the fourth aspect of the present invention. Such computer program product may be formed by computer readable instructions in any computer language such as, when executed on a processor, the processor is implementing or controlling the method steps of the proposed method. The computer program product may be stored on any type of computer readable medium such as a flash memory, an optical memory, a magnetic memory, a CD, a DVD, etc. Furthermore, the computer program product may be stored on a computer, a server or a data cloud from which it may be downloaded via a network such as the Internet.

BRIEF DESCRIPTION OF THE DRAWINGS

Below, example embodiments of the present invention are described with reference to the figures. However, neither the figures nor the description shall limit the present invention.

The figures are only schematics and not to scale.

DETAILED DESCRIPTION OF EXAMPLE EMBODIMENTS

Figure 1:
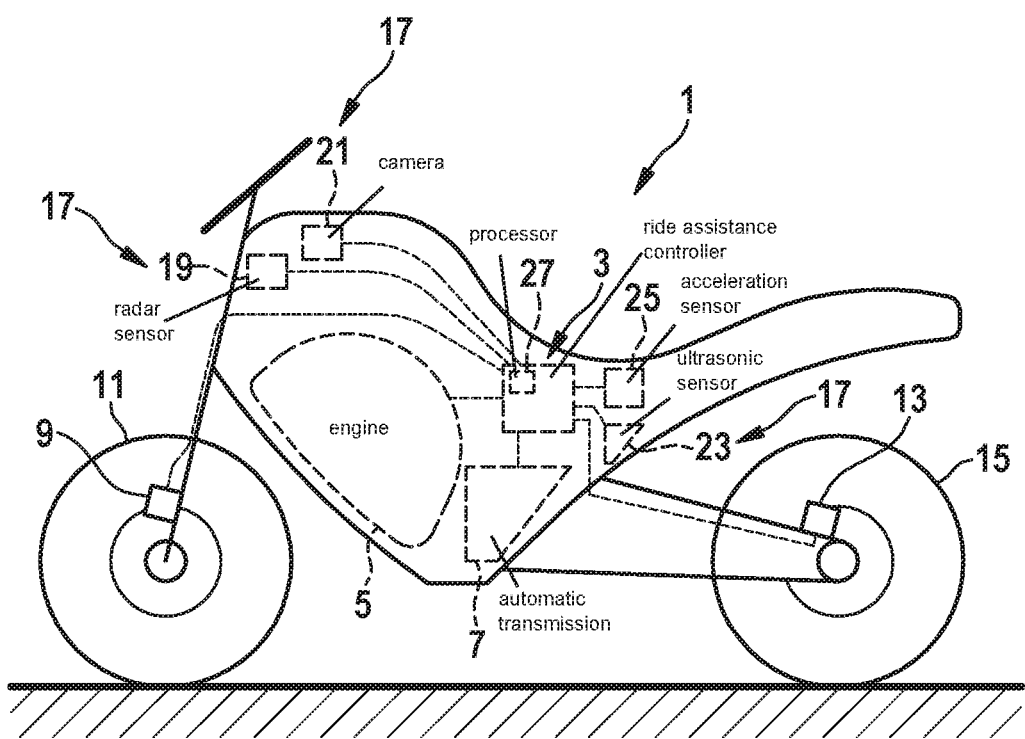
FIG. 1 shows a motorcycle with a ride assistant controller controlling a method for warning a driver according to an embodiment of the present invention.

FIG. 1 shows a motorcycle 1 with a ride assistant controller 3 according to an example embodiment of the present invention.

The motorcycle 1 comprises an engine 5 and an automatic transmission 7, an operation of which may be controlled, inter-alia, by the ride assistant controller 3. Furthermore, the motorcycle 1 comprises a front wheel brake 9 at a front wheel 11 and a rear wheel brake 13 at a rear wheel 15, an operation of which may be controlled, inter-alia, by the ride assistant controller 3.

The ride assistant controller 3 may receive and analyse signals from sensors 17 such as a radar sensor 19, a camera 21 and/or an ultrasonic sensor 23. Based on these signals, a critical traffic situation may be detected. For example, the sensor's signals may signal an approaching other vehicle, an obstacle on the road, a red light, etc.

Furthermore, the ride assistant controller 3 may receive and analyse signals from an acceleration sensor 25 indicating a current lean angle of the motorcycle 1. The acceleration sensor 25 may preferably sense accelerations along different directions. For example, the acceleration sensor 25 may sense accelerations in three directions being orthogonal to each other. Thereby, a current lean angle of the motorcycle indicating an angle between a vertical direction and a plane in which the motorcycle is leaned to a side may be measured with high accuracy. The current lean angle may be part of a current overall attitude of the motorcycle.

The ride assistant controller 3 has a processor 27 for processing signals from the sensors 17 and from the acceleration sensor 25. The ride assistant controller 3 may be programmable.

With the ride assistant controller 3, an automatic warning brake function may be implemented that makes a motorcycle rider to be aware of for example hazardous situations for example by temporarily actuating one of the brakes 9, 13. The hazardous situation may be recognised for example by using information got from surrounding sensing based on signals of one of the sensors 17.

Therein, it may be noted that, while the automatic warning brake function is conventional for passenger cars, such conventional systems may not be simply transferred to motorcycles due to the fact that vehicle dynamics are completely different between passenger cars and motorcycles. To implement a safe and effective warning brake function, the motorcycle specific considerations have to be taken into account. Particularly, for motorcycles, an automatic brake actuation could generate a big attitude change and might make a motor cycle unstable. However, as a purpose of a warning brake, it should be strong enough to inform a rider of hazardous situations. Accordingly, it is generally necessary to control front and rear brakes appropriately depending on the motorcycle's current attitude to make the function effective.

With example embodiments of the method and ride assistant controller 3 described herein, a safety and effectiveness of an automatic warning brake for a motorcycle may be improved by controlling acceleration forces on front and rear wheels of a motorcycle by using attitude information such as lean angle, pitch angle and jaw rate etc. On a motorcycle, components of the drive torque control, gear shifting, regenerative brake and hydraulic brake are applicable to generate brake forces for example. A combination of these components may also be considered depending on a current situation.

As an example, the automatic warning brake system of the motorcycle may consist of a radar and a camera as sensors 17, an inertial motion sensor for vehicle attitude detection, and engine torque control system for drive torque control, an automated shifting system for gear step control, hydraulic brake unit as a main brake, and a display for an optical warning. The system may then calculate required brake forces by integrating surround information and vehicle attitude information, and generate longitudinal motion by controlling engine torque, gear shifts and/or hydraulic brake. As a drive train, most of the motorcycles have rear axle drive with combustion engine, but it may be possible to have both of front and rear axle drive for example with in-wheel-motors. By controlling brake forces on the front and rear wheels appropriately, the system may improve a safety and effectiveness of the warning brake.

Accordingly, upon detecting a critical traffic situation based on the signals from the sensors 17, the driver may be warned by inducing an acceleration change onto the motorcycle 1. Therein, a current lean angle of the motorcycle 1 is monitored using the acceleration sensor 25 and a manner and/or degree of inducing the acceleration change onto the motorcycle 1 is set taking into account this current lean angle.

For example, a relationship between the lean angle LA and the warning brake acceleration could be considered as follows: Situation A: $0°<LA<15°$: a high degree of brake acceleration is possible Situation B: $15°<LA<30°$: a low degree of brake acceleration is possible Situation C: $LA>30°$: no brake acceleration is possible In situation B, the motorcycle is significantly leaned to a side such that brake induced acceleration for warning the driver should be limited to a lower degree compared to situation A. The suppression of the brake induced acceleration may depend on a roll angle necessary.

In situation C, the motorcycle is leaned to a side to such an extent that any additionally induced brake acceleration may be hazardous. In such situation, a rider should be aware of any hazardous situations by himself such that the warning brake function should not be necessary.

From the considerations above, controlling the warning brake function may be implemented by a combination of the following ways to generate the acceleration change onto the motorcycle:

i) Actuating of a Front Wheel Brake 9

By breaking the front wheel 11, a high brake force may be generated thereby inducing a high negative acceleration change. Generally, the actuation of the front wheel brake 9 is the most effective way to make a warning brake. However, because of an unstableness due to the strong brake force, the actuation of the front wheel brake 9 may be limited to the above-mentioned situation A.

ii) Actuating of the Rear Wheel Brake 13

The actuation of the rear wheel brake 13 is generally less effective than that of the front wheel brake 9, but still useful as a warning brake when the front wheel brake 9 is not recommended to be used in high lean angle situations such as in the above-mentioned situation B.

iii) Engine Torque Down

Torqueing down the output of the engine 5 of the motorcycle 1, i.e., reducing an acceleration torque generated by the engine 5, may generate relatively low brake forces. Generally, an acceleration change may only be induced when the rider is accelerating the motorcycle 1. In other words, engine torque down is also an effective way to generate a brake force though it is possible only when certain engine torque is requested by a rider. This option may be used preferably in combination with at least one of the front and rear wheel brake actuation.

iv) Transmission Shift Down

Shifting the automated transmission 7 of the motorcycle 1 to a lower gear may also generate relatively low brake forces. Furthermore, such option may only be applicable when the current gear is at least a second or higher gear. In other words, in case the motorcycle 1 has an automated transmission system, the gear shift down is also a way to generate brake forces. This may also have an acoustic warning effect because of increasing noise made by the engine 5. This option may also be used preferably in combination with at least one of the front and rear wheel brake actuation and/or the engine torque down.

Figure 2:
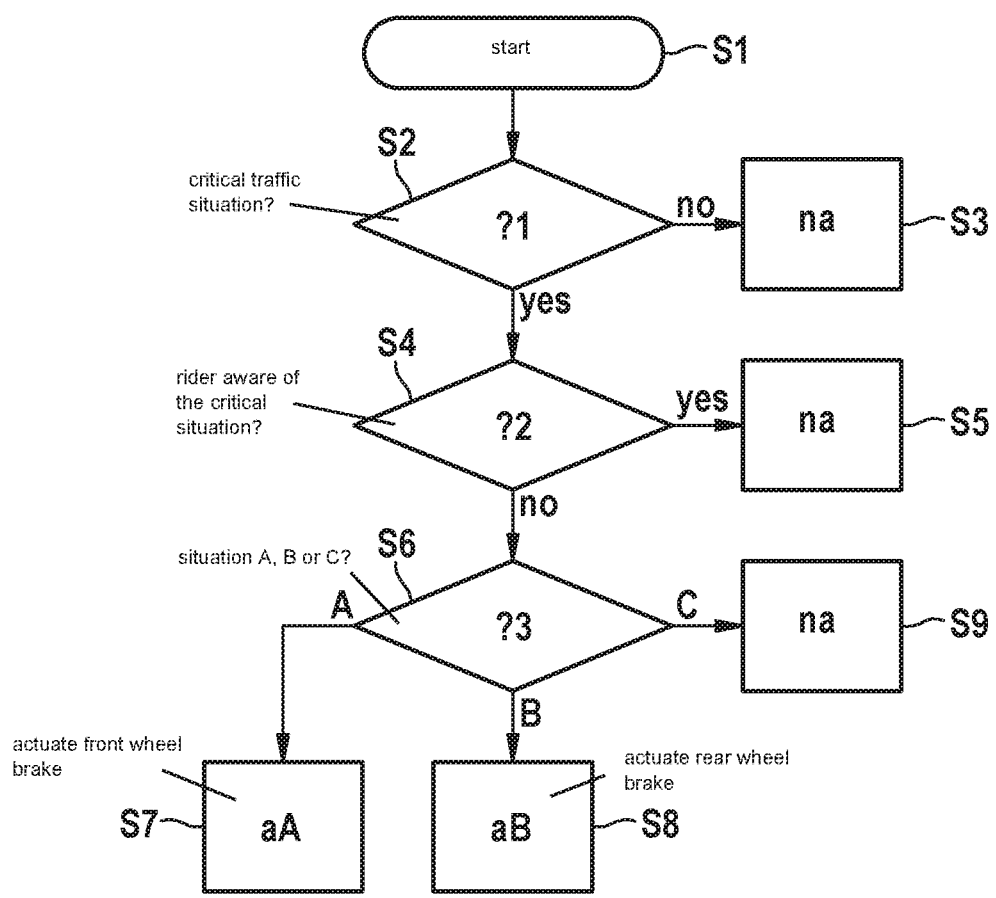
FIG. 2 shows a flowchart indicating method steps of the method according to an embodiment of the present invention.

The flowchart in FIG. 2 shows example method steps made during executing the proposed method for warning a driver of a motorcycle 1.

After having started the procedure (step S1), a decision ("?1") has to be taken regarding whether a critical traffic situation has occurred (step S2). This decision may be made based on continuously or repetitively analysing signals from the sensors 17. If no critical traffic situation is determined, no action ("na") has to be initiated (step S3).

If a critical traffic situation is determined, a further decision ("?2") has to be taken regarding whether a rider is aware of the critical situation (step S4). This decision may be taken based for example on detecting specific reactions made by the rider such as manually actuating brakes and/or changing a steering angle. If the critical traffic situation has been recognised by the rider, no further action has to be taken (step S5).

However, if the rider did not recognise the critical traffic situation, a further decision ("?3") has to be taken regarding the manner and/or degree of inducing an acceleration change onto the motorcycle 1 for warning the driver. Therein, the above-mentioned situations A, B, C may be distinguished based on continuously or repetitively measuring a current lean angle of the motorcycle.

In situation A, i.e. when the current lean angle is detected to be smaller than a predetermined first lean angle value of for example 15°, an action A ("aA") is initiated (step S7). In such action A, the front wheel brake 9 is actuated for inducing the acceleration change onto the motorcycle 1. Optionally, further measures such as actuating the rear wheel brake 13, reducing an acceleration torque generated by the engine 5 and/or shifting the automated transmission 7 to a lower gear may be applied additionally.

In situation B, i.e. when the current lean angle is detected to be more than the first lean angle value but less than a predetermined second lean angle value of for example 30°, an action B ("aB") is initiated (step S8). In such action B, the front wheel brake 9 is not actuated. Instead, only the rear wheel brake 13 is actuated for inducing the acceleration change onto the motorcycle 1. Optionally, further measures such as reducing the acceleration torque generated by the engine 5 and/or shifting the automatic transmission 7 to a lower gear may be applied additionally.

In situation C, i.e., when the current lean angle is more than the predetermined second lean angle value, no action ("na") is taken (step 9), i.e., any inducing of an acceleration change is suppressed.

What is claimed is:

1. A method for warning a driver of a motorcycle, the method comprising the following steps:
   monitoring traffic situations based on signals from at least one sensor of the motorcycle;
   upon detecting a critical traffic situation based on the signals from the at least one sensor, warning the driver by inducing an acceleration change onto the motorcycle, wherein a current lean angle of the motorcycle is monitored and a manner and/or degree of the inducing of the acceleration change onto the motorcycle is set taking into account the current lean angle of the motorcycle;
   wherein the acceleration change is induced by at least actuating a front wheel brake of the motorcycle when the current lean angle is smaller than a predetermined first lean angle value;
   wherein the acceleration change is induced exclusively by one or more of actuating a rear wheel brake of the motorcycle, reducing an acceleration torque generated by an engine of the motorcycle, and temporarily shifting an automated transmission of the motorcycle to a lower gear, when the current lean angle is bigger than the predetermined first lean angle and smaller than a predetermined second lean angle value, the first lean angle value being smaller than the second lean angle value; and
   wherein no acceleration change is induced when the current lean angle is bigger than the predetermined second lean angle.

2. The method of claim 1, wherein the inducing of the acceleration change is applied for a predetermined period.

3. The method of claim 1, wherein the actuation of the front or wheel brakes or the reduction of the acceleration torque are applied for a predetermined period of time.

4. The method of claim 1, wherein the shifting of an automated transmission of the motorcycle to a lower gear is compensated by shifting back to an original higher gear within a predetermined period of time.

5. The method of claim 2, wherein the period of time is between 0.1 seconds and 2 seconds.

6. The method of claim 1, wherein a strength of the induced acceleration change is set higher for a smaller current lean angle.

7. The method of claim 1, wherein the predetermined first lean angle value is smaller than 20°.

8. The method of claim 1, wherein the predetermined second lean angle value is smaller than 35°.

9. A ride assistant controller for a motorcycle, the ride assistant controller configured to warn a driver of a motorcycle, the ride assistant controller configured to:
   monitor traffic situations based on signals from at least one sensor of the motorcycle;
   upon detecting a critical traffic situation based on the signals from the at least one sensor, warn the driver by inducing an acceleration change onto the motorcycle, wherein a current lean angle of the motorcycle is monitored and a manner and/or degree of the inducing of the acceleration change onto the motorcycle is set taking into account the current lean angle of the motorcycle;
   wherein the acceleration change is induced by at least actuating a front wheel brake of the motorcycle when the current lean angle is smaller than a predetermined first lean angle value;
   wherein the acceleration change is induced exclusively by one or more of actuating a rear wheel brake of the motorcycle, reducing an acceleration torque generated by an engine of the motorcycle, and temporarily shifting an automated transmission of the motorcycle to a lower gear, when the current lean angle is bigger than the predetermined first lean angle and smaller than a predetermined second lean angle value, the first lean angle value being smaller than the second lean angle value; and wherein no acceleration change is induced when the current lean angle is bigger than the predetermined second lean angle.

10. A motorcycle, comprising:
   a ride assistant controller configured to warn a driver of a motorcycle, the ride assistant controller configured to monitor traffic situations based on signals from at least one sensor of the motorcycle, upon detecting a critical traffic situation based on the signals from the at least one sensor, warn the driver by inducing an acceleration change onto the motorcycle, wherein a current lean angle of the motorcycle is monitored and a manner and/or degree of the inducing of the acceleration change onto the motorcycle is set taking into account the current lean angle of the motorcycle, wherein the acceleration change is induced by at least actuating a front wheel brake of the motorcycle when the current lean angle is smaller than a predetermined first lean angle value, wherein the acceleration change is induced exclusively by one or more of actuating a rear wheel brake of the motorcycle, reducing an acceleration torque generated by an engine of the motorcycle, and temporarily shifting an automated transmission of the motorcycle to a lower gear, when the current lean angle is bigger than the predetermined first lean angle and smaller than a predetermined second lean angle value, the first lean angle value being smaller than the second lean angle value, and wherein no acceleration change is induced when the current lean angle is bigger than the predetermined second lean angle; and an acceleration sensor configured to determine the current lean angle of the motorcycle.

11. A non-transitory computer readable medium on which is stored a computer program for warning a driver of a motorcycle, the computer program, when executed by a computer, causing the computer to perform the following steps:

monitoring traffic situations based on signals from at least one sensor of the motorcycle;

upon detecting a critical traffic situation based on the signals from the at least one sensor, warning the driver by inducing an acceleration change onto the motorcycle, wherein a current lean angle of the motorcycle is monitored and a manner and/or degree of the inducing of the acceleration change onto the motorcycle is set taking into account the current lean angle of the motorcycle;

wherein the acceleration change is induced by at least actuating a front wheel brake of the motorcycle when the current lean angle is smaller than a predetermined first lean angle value;

wherein the acceleration change is induced exclusively by one or more of actuating a rear wheel brake of the motorcycle, reducing an acceleration torque generated by an engine of the motorcycle, and temporarily shifting an automated transmission of the motorcycle to a lower gear, when the current lean angle is bigger than the predetermined first lean angle and smaller than a predetermined second lean angle value, the first lean angle value being smaller than the second lean angle value; and wherein no acceleration change is induced when the current lean angle is bigger than the predetermined second lean angle.

* * * * *